United States Patent [19]

Palisin, Jr.

[11] 3,977,839

[45] Aug. 31, 1976

[54] COATED METAL ARTICLE AND METHOD OF COATING

[75] Inventor: Stephen P. Palisin, Jr., Cleveland, Ohio

[73] Assignee: The Empire Plating Company, Cleveland, Ohio

[22] Filed: Oct. 6, 1975

[21] Appl. No.: 619,832

Related U.S. Application Data

[60] Division of Ser. No. 418,114, Nov. 21, 1973, which is a continuation-in-part of Ser. No. 200,224, Nov. 18, 1971, Pat. No. 3,790,355, which is a continuation of Ser. No. 887,397, Dec. 22, 1969, abandoned.

[52] U.S. Cl. .......... 29/195; 204/37 R; 204/38 E

[51] Int. Cl.[2] .......... B32B 15/04

[58] Field of Search .......... 29/195 P, 195 T; 204/38 E, 37 R

[56] References Cited

UNITED STATES PATENTS

| | | | |
|---|---|---|---|
| 3,526,486 | 9/1970 | Smith et al. | 29/195 X |
| 3,671,205 | 6/1972 | Uchida et al. | 29/195 |
| 3,860,398 | 1/1975 | Tsurumaru et al. | 29/195 |

*Primary Examiner*—L. Dewayne Rutledge
*Assistant Examiner*—E. L. Weise
*Attorney, Agent, or Firm*—David A. Burge Co.

[57] ABSTRACT

Methods of coating metal articles to protect them from corrosion, and the products of such methods. Metal articles which have been electroplated with zinc, cadmium, nickel or chromium, are chromated, and coated with a hydrophobic thermosetting polymer, and heated to convert the polymer to a hard, adherent film. Multiple polymer coatings are applied prior to heat curing.

5 Claims, No Drawings

COATED METAL ARTICLE AND METHOD OF COATING

CROSS REFERENCE TO RELATED APPLICATION AND PATENT

This is a division of application Ser. No. 418,114 filed Nov. 21, 1973 which is a continuation-in-part of a co-pending application filed Nov. 18, 1971, Ser. No. 200,224, now issued as U.S. Pat. No. 3,790,355 dated Feb. 5, 1974 which was, in turn, a continuation of application Ser. No. 887,397 filed Dec. 22, 1969, now abandoned, the disclosures of these prior applications being specifically incorporated herein by reference.

BACKGROUND OF THE INVENTION

1. Field of the Invention

The present invention relates to the coating of metal articles to improve their corrosion resistance.

2. Prior Art

The referenced patent and application describe methods of protecting metallic surfaces to render them highly resistant to salt spray corrosion and to abrasion. In accordance with these methods, articles having a metal surface composed typically of aluminum, iron, zinc, brass and copper alloys are electroplated with zinc, cadmium, nickel or chromium, and are then chromated, rinsed and coated with a thermosetting polymer. The chromating step is carried out using a water solution containing about 6 ounces to about 16 ounces per gallon of liquid composed of about 90% $CrO_3$ and about 10% sodium bisulfate.

The process described in the referenced patent and application can not be used in some applications involving hardened, high carbon steels. Since the processing includes an electroplating step, there is a danger that the high carbon steel will be subject to hydrogen embrittlement.

In the manufacture of steel fasteners used in automobiles seat belt harnesses, for instance, the danger of hydrogen embritlement rules out the use of a corrosion protective process which includes electroplating. A well known alternative is to phosphate the hardened steel, and then apply oil or paint over the phosphate.

In automobile seat belt harnesses, oil cannot be used as it will come into contact with the clothes of the vehicle's occupants. Paint is undesirable from aesthetic and wearability view points. For these reasons, no added protective coating has been applied over the phosphate, and corrosion is often so rapid as to discolor and corrode the fasteners even before the car has been delivered to its owner.

Known phosphating processes typically include the five steps of:

1. Cleaning to metal to be coated with an alkaline cleaner to remove soil, oil, grease, etc.;
3. Rinsing in water;
3. Coating in a phosphate coating bath commonly employing zinc and phosphate compounds in solution that combine to give a zinc phosphate coating;
4. Rinsing once again in water; and
5. Sealing the phosphate coating with a weak chromate acid rinse.

SUMMARY OF THE INVENTION

The present invention overcomes the foregoing and other drawbacks of the prior art, and provides novel and improved highly corrosion resistant protective coatings for metal articles.

In accordance with one aspect of the present invention, it has been found that phosphate coated high carbon steels can be treated with chromate and coated with a thermosetting polymer to produce a highly abrasion resistant, corrosion resistant protective surface. The present invention obviates the weak chromate acid rinse step commonly used at the end of the phosphate coating process and substitutes in its place a chromating step employing a much more concentrated solution. A blemish free colorless chromate coating is supplied by treating the phosphated metal surface for about 15 seconds to about 25 seconds with water containing between about 6 ounces and about 16 ounces per gallon of a liquid composed of about 90% $CrO_3$ and about 10% sodium bisulfate. The chromated surface is then rinsed with water to flush away any remaining chromating solution. A hydrophobic thermosetting polymer is then applied and the article is heated to above about 300° F. to convert the polymer to hard, colorless transparent film.

In accordance with another aspect of the present invention, it has been found that metallic surfaces other than high carbon steels can also be phosphated, chromated and polymer coated to provide highly corrosion resistant, abrasion resistant surfaces. The process has application to metals consisting typically of, alumunium, iron, zinc, brass and copper alloys.

In accordance with still another aspect of the present invention, it has been found that the uniformity of the polymer coating and its abrasion resistant character can be substantially improved by applying the polymer in a plurality of coatings prior to heating the article to effect thermosetting of the polymer. The multiple polymer coatings are applied in relatively rapid sequence after each of the previous coatings has become tacky. It is found that a single heating step will concurrently set all of the coatings forming a hard, colorless, transparent film which is highly resistant to abrasion and to corrosion.

As will be apparent from the foregoing summary, it is an object of the present invention to provide novel and improved highly corrosion resistant protective coating for metal articles, together with metal articles having highly corrosion resistant protective coatings.

Other objects and a fuller understanding of the invention may be had by referring to the following description and claims.

DESCRIPTION OF THE PREFERRED EMBODIMENT

Accordingly to the present invention, metal articles composed of aluminum, cast iron, malleable iron, steel, zinc, brass or copper alloys are cleaned in any suitable conventional manner, for example, by tumbling the article in caustic soda or by passing an electric current through such a solution with the metal article constituting the anode. After such cleaning, the article is rinsed in cold water, is then dipped in a dilute acid solution, and again rinsed in cold water. When the article is composed of ferrous metal, aluminum, brass or copper alloys, a 10% sulfuric acid solution or a 25% hydrochloric solution is sufficient to neutralize the caustic soda. When the article is composed of zinc, a very weak acid solution is used.

In certain instances where even better cleaning of a ferrous metal article is desired or where its surfaces is to be activated, the article may be reversely treated in an alkaline cyanide bath, i.e., by passing a current through the bath for about 30 seconds while the article is the anode in the circuit and then reversing the current flow for about 30 seconds while the article is the cathode in the circuit. Following this reverse treatment, the article is rinsed in water if it is to be plated promptly thereafter, or it may be rinsed in a dilute sodium cyanide solution to prevent rusting when it is not to be plated promptly.

The thus cleaned metal article composed of iron, brass or copper alloys is then electrolytically plated in a conventional manner, as by making it the cathode in an electrolytic bath. Preferably cadmium or zinc is the coating metal and either may be deposited on the article from a conventional bath such, for example, as cadium cyanide or zinc cyanide. Nickel or chromium may also be used as coating metals. Any suitable conventional bath composition may be used for depositing either of these metals, for example, a nickel sulfate may be used for the nickel deposition and a chromic acid bath may serve for the chromium deposition. A current density of about 10 amperes per square foot is suitable and the plating action is continued until between about 0.0002 to about 0.005 in. layer of the base metal has been deposited on the article.

On aluminum, a layer of another metal such, for example, as copper may be applied before the coating of cadmium or zinc is applied. When the article is composed of zinc, a coating of cadmium, zinc, nickel or chromium is deposited on the surface thereof. After such deposition, the article is rinsed with water and then is rinsed in dilute aqueous nitric acid.

In place of the foregoing electroplating and rinsing operations, the metallic article can be phosphated as by washing the article in an alkaline cleaner, rinsing it in water, coating it in a phosphating bath typically including zinc and phosphate compounds which in solution combine to give a zinc phosphate coating, whereafter the article is rinsed in water. The phosphating procedure is preferable in conjunction with relatively high carbon, hardened steel alloys where an electroplating step might result in hydrogen embrittlement.

Following the electroplating, or phosphating operations, the coated article is chromated. This chromating step consists of treating the article in such a manner as to convert the metal surface thereof into a clear, stain-free finish with corrosion resisting properties. While various substances may be used for such chromating action, I prefer to use a chromating material consisting of about 90% chromium trioxide and about 10% sodium bisulfate dissolved in water, the concentration of this chromating material being between about 6 and about 16 ounces per gallon of water. The article to be chromated is thoroughly rinsed to free it from alkalis and is then dipped into the chromating solution for between about 10 seconds and about 25 seconds. Preferably the solution should be at a temperature between about 65° F. and about 95° F.

Upon removing the article from the chromating bath, it is thoroughly rinsed with water. The chromated surface is then covered with a hydrophobic, thermosetting polymer and the article is heated at a temperature between about 300° F. and about 400° F. until the polymer has been baked and has become a hard film. The heating time depends somewhat on the thickness of the metal article and its variations in thickness. Preferably the heating is continued long enough for all parts of the metal article to be brought in the above specified range of temperatures.

A preferred hydrophobic thermosetting film-forming polymer composition is as follows:

| | | |
|---|---|---|
| Hexamethoxy methyl melamine | about | 15.3% |
| Ethyl Acrylate | " | 16.0% |
| Methacrylic Acid | " | 1.0% |
| Chromium Trioxide | " | 0.1% |
| Water | " | 67.6% |

Other film-forming compositions which may be used include the hexamethoxy methyl melamine of the foregoing composition with equivalents of the other ingredients thereof.

The above preferred film-forming composition has given new and unexpected results in terms of corrosion prevention. For example, the films formed by this invention have been shown to have a pencil hardness of H-3, excellent flexability, abrasion resistance and adhesion, and have evidenced no degraduation after being disposed for well over 100 hundred hours to humidity and salt spray conditions. In contrast therewith, films composed of epoxy solvent lacquer have exhibited a pencil hardness of H, good flexibility and abrasion resistance, and fair adhesion, and were affected when exposed for 100 hours to humidity or to salt spray.

Films composed of nitrocellulose have exhibited a pencil hardness of H, poor flexibility and abrasion resistance, fair adhesion, and were affected when exposed for 25 hours to humidity or salt spray.

In accordance with another aspect of the present invention, it has been found that uniformity of the thermosetting polymer coat and its abrasion resistance can be substantially improved by applying a plurality of polymer coatings prior to heat setting the polymer. It is preferable to apply each successive polymer coating after the previous coat has become tacky. Depending on the type of polymer coating used, the second coating can be applied almost instantly, or may require a few seconds delay between coating applications. Vastly superior results have been found where two polymer coatings are applied prior to heat setting the polymer. Added polymer coatings prior to heat setting have produced additional protective benefits.

Having thus described the invention in such full, clear, concise and exact terms as to enable any person skilled in the art to which it pertains to make and use the same, and having set forth the best mode contemplated of carrying out this invention, I state that the subject matter which I regard as being my invention is particularly pointed out and distinctly claimed in what is claimed, it being understood that the equivalents or modifications of, or substitutions for, parts of the above specifically described embodiments of the invention may be made without departing from the scope of the invention as set forth in what is claimed.

What is claimed is:

1. A method of protecting a metallic surface to render it resistant to salt spray corrosion and to abrasion, wherein the surface is composed of a metal selected from the group of metals consisting of aluminum, zinc, brass, ferrous metals, and copper alloys, comprising the steps of:

a. electroplating the surface with a metal selected from the group of metals consisting of zinc, cadmium, nickel and chromium;

b. chromating the electroplated surface to produce a substantially blemish-free chromate coating thereon by treating it for between about 15 seconds and about 25 seconds with water containing between about 6 ounces and about 16 ounces per gallon of a liquid composed of about 90% of $CrO_3$ and about 10% sodium bisulphate;

c. rinsing the chromated surface to flush away chromating solution remaining thereon;

d. coating the chromated surface with a plurality of coats of a transparent hydrophobic thermosetting polymer; and, e. heating the article to above about 300°F. to convert the multiple polymer coats to a hard transparent film thereby providing a surface with a blemish-free corrosion resistant finish.

2. The method of making a metal article resistant to corrosion which comprises the steps of electroplating, with a metal selected from the group of metals consisting of zinc, cadmium, nickel and chromium, a surface of an article composed of metal selected from the group of metals consisting of aluminum, zinc, brass, copper alloys, and ferrous metals chromating the electroplated surface by treating it for between about 15 seconds and about 25 seconds with water containing between about 6 oz. and about 16 oz. per gallon of a liquid composed of about 90% of $CrO_3$ and about 10% of sodium bisulfate, rinsing the resulting chromated surface with water, covering the rinsed chromated surface with a plurality of coats of hydrophobic thermosetting polymer and heating said article to about about 300°F. to concurrently convert said plurality of coats of polymer into a hard film.

3. A method of protecting a metallic surface from corrosion wherein the surface is composed of a metal selected from the group of metals consisting of aluminum, brass, copper alloys, ferrous metals and zinc, comprising the steps of:

a. electroplating the surface with a metal selected from the group of metals consisting of zinc, cadmium, nickel and chromium;

b. chromating the electroplated surface to produce a substantially blemish-free chromate coating thereon by treating it for between about 15 seconds and about 25 seconds with water containing between about 6 ounces and about 16 ounces per gallon of a liquid composed of about 90% of $CrO_3$ and about 10% sodium bisulphate;

c. rinsing the chromated surface to flush away chromating solution remaining thereon;

d. coating the chromated surface with a transparent hydrophobic thermosetting polymer by coating substantially all of the surface with a first coat of said polymer and by recoating substantially all of the surface with a second coat of said polymer; and, e. concurrently thermosetting the polymer coats to form a common, hard, transparent film adhered to the chromated surface.

4. A metal article composed of a metal selected from the group of metals consisting of aluminum, brass, copper alloys, zinc, and ferrous metals, having an electrodeposited coating on a surface thereof selected from the group of metals consisting of zinc, cadmium, nickel and chromium, said electrodeposited coating have a chromated surface formed by being treated for between about 15 seconds and about 25 seconds with water containing between about 6 oz. and about 16 oz. per gallon of a liquid composed of about 90% of $CrO_3$ and about 10% of sodium bisulfate followed by rinsing the chromated surface with water, and a film of hydrophobic thermosetting polymer formed from a plurality of coats of said polymer and adhering to said chromated surface, which coats have been concurrently hardened by heating the article to above about 300°F.

5. An article having a corrosion protected metallic surface composed of a metal selected from the group of metals consisting of aluminum, brass, copper alloys, ferrous metals and zinc, having an electrodeposited coating thereon selected from the group of metals consisting of zinc, cadmium, nickel and chromium, said electrodeposited coating having a chromated surface formed by being treated for between about 15 seconds and about 25 seconds with water containing between about 6 oz. and about 16 oz. per gallon of a liquid composed of about 90% of $CrO_3$ and about 10% of sodium bisulfate, and a film of hydrophobic thermosetting polymer formed by coating substantially all of the chromated surface with a first coat of said polymer, by recoating substantially all of the surface with a second coat of said polymer, and by concurrently thermosetting the polymer coats to form a single hard transparent film adhered to the chromated surface.

* * * * *